Dec. 11, 1951  G. A. REINHARD  2,578,015
TRANSMISSION
Filed July 10, 1945  2 SHEETS—SHEET 1

INVENTOR
Gustav A. Reinhard
BY John Mahoney
ATTORNEY

Dec. 11, 1951  G. A. REINHARD  2,578,015
TRANSMISSION
Filed July 10, 1945  2 SHEETS—SHEET 2

INVENTOR.
Gustav A. Reinhard
BY John Mahoney
ATTORNEY

Patented Dec. 11, 1951

2,578,015

UNITED STATES PATENT OFFICE 2,578,015

TRANSMISSION

Gustav A. Reinhard, Shaker Heights, Ohio

Application July 10, 1945, Serial No. 604,189

3 Claims. (Cl. 318—8)

My invention relates to a system for transmitting power to drive a rotatable member, such as a gear or shaft, at a comparatively large number of different speeds.

In driving shafts for various purposes, such as for operating printing presses, flat work ironers, wood working machines, lathes, and the like, it is often desirable to provide means for driving the shaft at a comparatively large number of different speeds. Various systems have heretofore been utilized for this purpose, such as a shiftable train of gears. Gear trains, however, are not very efficient for such purposes because as the number of gears in such trains increases, the efficiency of the system decreases and the control apparatus for shifting the gears becomes more complicated.

It has also been proposed to utilize electronic means for driving shafts at various speeds. The use of electronic means for such purposes, however, is not only inefficient but such systems are comparatively expensive because it is necessary to provide a transformer to vary the voltage, a rectifying tube to convert alternating current into direct current, and complicated means for controlling the system.

It is the purpose of the present invention to provide an improved system by means of which a large number of different speeds may be imparted to a rotatable element or driving shaft and while my improved system may, if desired, be utilized with direct current motors, I preferably utilize alternating current motors of the induction type. My improved system distinguishes from a gear train in that the control system is much simpler and in my improved system the change in speed imparted to the driving shaft is effected by a reaction of pressures and not by pressure between the teeth as occurs in the usual train of gears.

It is therefore an object of my invention to provide improved transmission means associated with a pair of prime movers by means of which a shaft may be rotated at a comparatively large number of different speeds.

Another object of my invention is to provide an improved transmission by means of which power may be transmitted from a pair of alternating current motors of the induction type to drive a shaft at a comparatively large number of different speeds.

Other objects and advantages of my invention will be apparent as the specification proceeds.

My invention will be better understood by reference to the accompanying drawings in which:

Fig. 1. is a plan view of my improved system with the gear casing broken away to show underlying structure and with parts in section;

Figure 1:
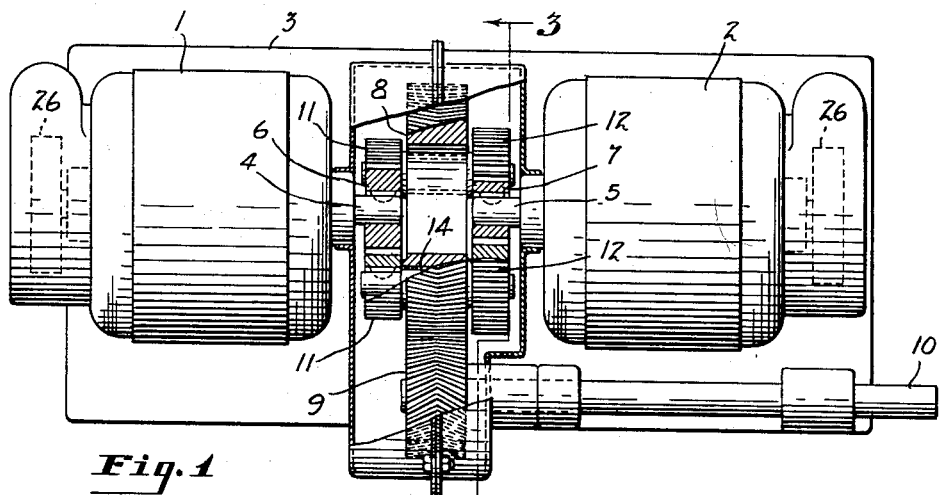

Generally stated, my improved system includes a pair of reversible motors with their shafts arranged in alignment with each other and gear means associated with each shaft which cooperate to drive a rotatable element at various speeds depending upon the speed and direction of rotation of the motors and while my improved system may be embodied in various forms and I do not desire to be limited to the details disclosed in the drawings, for purposes of illustration, three modifications are disclosed.

Figure 2:
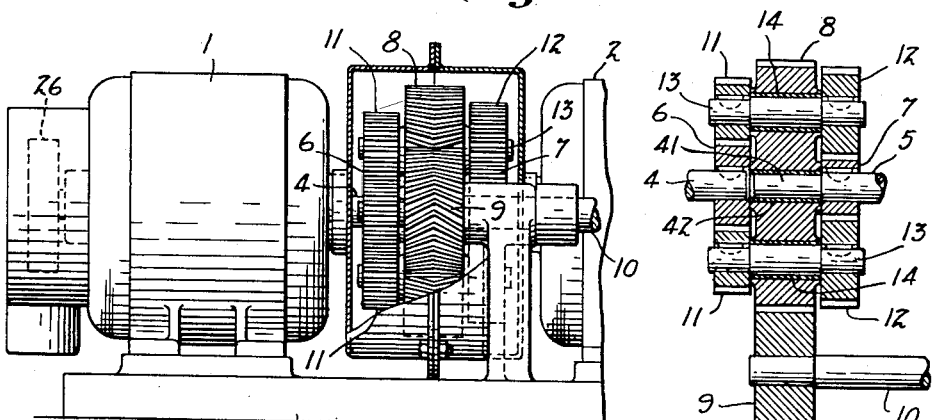
Fig. 2 is a front elevational view of my improved system with the gear casing broken away to show adjacent structure.
Figure 3:
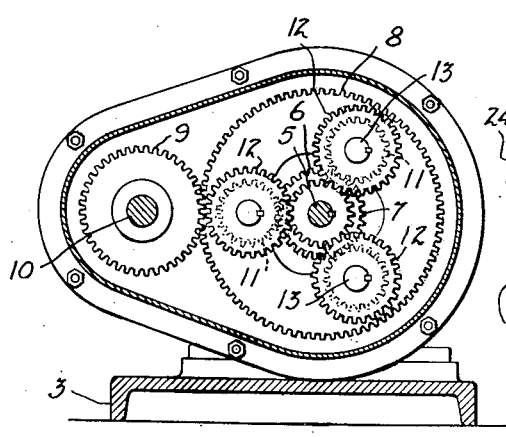
Fig. 3 is a cross sectional view on the line 3—3 of Fig. 1 as viewed in the direction of the arrows.

In the modification shown in Figs. 1 to 3, my improved system comprises a pair of spaced motors 1 and 2 mounted on a suitable base 3 and having aligned shafts 4 and 5, respectively, extending toward but spaced from each other. Shafts 4 and 5 are provided with gears 6 and 7, respectively, having different pitch diameters and associated with each of the shaft gears are means including a plurality of pinions driven by one or both of said shafts which cooperate with each other to drive a rotatable element 8 at various speeds.

As illustrated, shaft gear 6 of motor 1 has a larger pitch diameter than shaft gear 7 of motor 2 and the means associated with the shaft gears consists of three or more pinions 11 of the same pitch diameter which mesh with and have a smaller pitch diameter than shaft gear 6 and three or more pinions 12 of the same pitch diameter which mesh with and have a larger pitch diameter than shaft gear 7. The pitch diameter of shaft gear 6 plus the pitch diameter of one of the pinions 11 is equal to the pitch diameter of shaft gear 7 plus the pitch diameter of one of the pinions 12 and the arrangement of pinions 11 with respect to pinions 12 are such that when pinions 11 are in mesh with shaft gear 6 and pinions 12 are in mesh with shaft gear 7, the axis of each pinion 11 is aligned with the axis of a pinion 12 and is connected thereto by means of a shaft 13 which rotates in a bushing 14 arranged in an opening in rotatable element 8.

With the system arranged as shown in Figs. 1 to 3 of the drawing and assuming that motor 1 and 2 may either be maintained stationary or rotated in either direction at a definite speed, it is apparent that gear 8 and shaft 10 may be rotated at four different speeds.

For instance, assuming that motor 2 is rotated in a clockwise direction as viewed from the right hand end of motor 2 and motor 1 is maintained stationary, it will be apparent that pinions 12 will be rotated in a counterclockwise direction. Each pinion 11, however, is attached to the same shaft as the pinion 12 arranged opposite thereto and consequently pinions 11 are also rotated in a counterclockwise direction and must rotate at the same speed as pinions 12. Shaft gear 6, however, remains stationary and consequently the rotation of pinions 11 can only be effected by revolving pinions 11 around shaft pinions 6 which causes rotation of gear 8. Gear 8, however, will rotate in such direction and at such speed as to equalize instantaneously the rotation of pinions 12 and 11 which in the example given is effected by the rotation of gear 8 in a counterclockwise direction at such speed that the rotation of pinions 11 by revolving them around shaft gear 6 is equal to the rotative speed imparted to pinions 12 by the rotation of shaft gear 7 plus the rotative speed imparted to pinions 12 by revolving them around shaft gear 7. In the example just given, it will of course be apparent that by rotating shaft 5 of motor 2 in a counterclockwise direction, gear 8 will be rotated in a clockwise direction.

Another speed of gear 8 and shaft 10 may be obtained by rotating shaft 4 of motor 1 in a clockwise direction as viewed from the right hand end of motor 2 while maintaining motor 2 at rest. The rotation of motor 1 in a clockwise direction has the tendency to rotate pinions 11 in a counterclockwise direction. Each of the pinions 12, however, is attached to the same shaft as the pinion 11 arranged opposite thereto and consequently pinions 12 rotate in the same direction and at the same speed as pinions 11 and gear 8 must therefore rotate in such direction and at such speed that the rotative speeds of pinions 12 and pinions 11 are equalized and since pinions 11 rotate upon their own axes at greater speed in revolving around shaft gear 6 than pinions 12 rotate upon their own axes in revolving around shaft gear 7, it is apparent that when shaft gear 6 is rotated in a clockwise direction, the rotation of pinions 11 and 12 can only be equalized by the rotation of gear 8 in a clockwise direction at such a speed that the clockwise rotation of pinions 12 effected by revolving them around shaft gear 7 in a clockwise direction will be equal to the clockwise rotation of pinions 11 effected by revolving them around shaft gear 6 minus the counterclockwise rotation imparted to pinions 11 by the rotation of shaft gear 6 in a clockwise direction. It will also be apparent that by rotating motor 1 in a counterclockwise direction while motor 2 is maintained at rest, gear 8 will be rotated in a counterclockwise direction at the same speed as when motor 1 is rotated in a clockwise direction while motor 2 is maintained at rest.

A third speed may be obtained by rotating both motors 1 and 2 at the same speed in a clockwise direction as viewed from the right hand end of motor 2. When both motors are rotated clockwise, shaft gear 7 tends to rotate pinions 12 in a counterclockwise direction and shaft gear 6 attempts to rotate gear pinions 11 in a counterclockwise direction but at a higher speed than shaft gear 7 tends to rotate pinions 12. Since each pinion 12, however, is affixed to the same shaft as the pinion 11 arranged opposite thereto, gear 8 must rotate on its own axis at sufficient speed so that the pinions 11 will rotate on their axes at the same speed as pinions 12 rotate on their axes. If gear 8 rotates in a counterclockwise direction, this equalization could never be obtained because when pinions 11 are revolved around shaft gear 6, their rotation increases at a faster rate than the increase of rotation of pinions 12 due to their revolution around gear shaft 7. If gear 8, however, is rotated in a clockwise direction at sufficient speed, the rotative speed of pinions 11 and 12 will be equalized when gear 8 is rotated at sufficient speed that the clockwise rotation of pinions 11 caused by their revolution around shaft gear 6 minus the counterclockwise rotation of pinions 11 imparted by shaft gear 6 is equal to the clockwise rotation of pinions 12 caused by the revolution of pinions 12 around shaft gear 7 minus the counterclockwise rotation of pinions 12 imparted by the rotation of shaft gear 7 in a clockwise direction. It will of course be apparent that by reversing the rotation of both motors, gear 8 may be rotated in a counterclockwise direction.

A further speed of gear 8 and shaft 10 may be obtained when motor 1 is rotated in a clockwise direction at a certain speed while motor 2 is rotated at the same speed in a counterclockwise direction as viewed from the right hand end of motor 2. When shaft gear 6 is rotated clockwise, it attempts to rotate pinions 11 in a counterclockwise direction and when shaft gear 7 is rotated in a counterclockwise direction, it attempts to rotate pinions 12 in a clockwise direction but at a lower speed than shaft gear 6 attempts to rotate pinions 11. Each pinion 11, however, it attached to the pinion 12 arranged opposite thereto and consequently pinions 11 and pinions 12 must be rotated in the same direction at the same speed and gear 8 must therefore be rotated at such speed and in a direction to effect this result. If gear 8 is rotated in a counterclockwise direction, this equalization of the rotative speeds of pinions 11 and 12 could never be obtained because pinions 11 are already rotating in a counterclockwise direction at a greater speed than pinions 12 are rotating in a clockwise direction and consequently if gear 8 were rotated in a counterclockwise direction, the difference between the rotative speeds of the two sets of pinions would be increased instead of diminished. When gear 8, however, is rotated in a clockwise direction, the rotative speeds of pinions 11 and pinions 12 will be equalized when the rotation imparted to pinions 11 by revolving them around shaft gear 6 in a clockwise direction minus the counterclockwise rotation imparted to pinions 11 by the rotation of shaft gear 6 in a clockwise direction is equal to the clockwise rotation imparted to pinions 12 by rotating shaft gear 7 in a counterclockwise direction plus the clockwise rotation imparted to pinions 12 when they are rotated around shaft gear 7 in a clockwise direction. Gear 8, however, may of course be rotated in a counterclockwise direction at the same speed as in the example just given by reversing the direction of motors 1 and 2.

Figure 5:
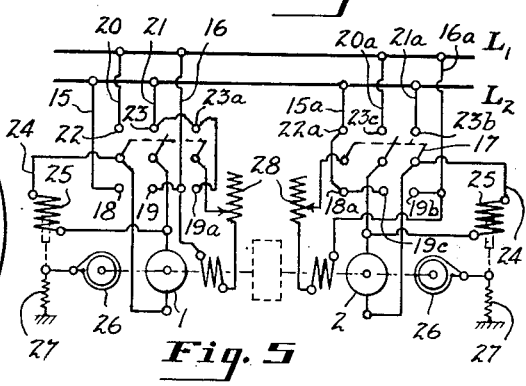
Fig. 5 is a wiring diagram showing the electrical connections of the motors when direct current motors are utilized.

When motors 1 and 2 are of the direct current type, they may be energized by means of the circuit shown in Fig. 5. As shown diagrammatically, current is conducted from line $L_1$ and $L_2$ to motor 1 through conductors 15 and 16 when switch 17 makes contact with terminals 18, 19 and 19a to rotate the motor in one direction or through conductors 20 and 21 to rotate the motor in the opposite direction when switch 17 is in contact with terminals 22, 23 and 23a. When the motor is energized, a parallel circuit 24 having a solenoid 25 therein is provided to release brake 26 which is held in applied position when the circuit is in open position by means of spring 27. A variable resistor 28 is also arranged in the field circuit to vary the speed of the motor. The circuit to motor 2 is similarly arranged with current being supplied from line $L_1$ and $L_2$ to rotate the motor in one direction through conductors 15a, 20a and 21a when switch 17 engages terminals 22a, 23c and 23b and to rotate the motor in the opposite direction when current is supplied from lines $L_1$ and $L_2$ through conductors 15a and 16a and switch 17 is in engagement with terminals 18a, 19c and 19b. With the motors arranged as shown in Fig. 5, it will be apparent that the motors may be reversed and that the speed of rotation of either motor 1 or motor 2, or both, may be varied and consequently gear 8 may be rotated in either direction at almost any desired speed.

Figure 4:
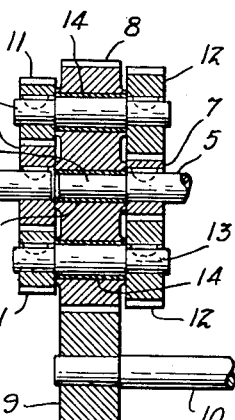
Fig. 4 is a central cross sectional view of a modified form of my improved system.

As shown in Figs. 1 to 3, rotatable element 8 is of the floating type and is in the form of a herringbone gear which meshes with herringbone gear 9 attached to a shaft 10 to be driven. I do not desire, however, to be limited to this particular structure because gear 8 may be supported by an extension on one of the motor shafts as shown in Fig. 4 of the drawings.

Figure 6:
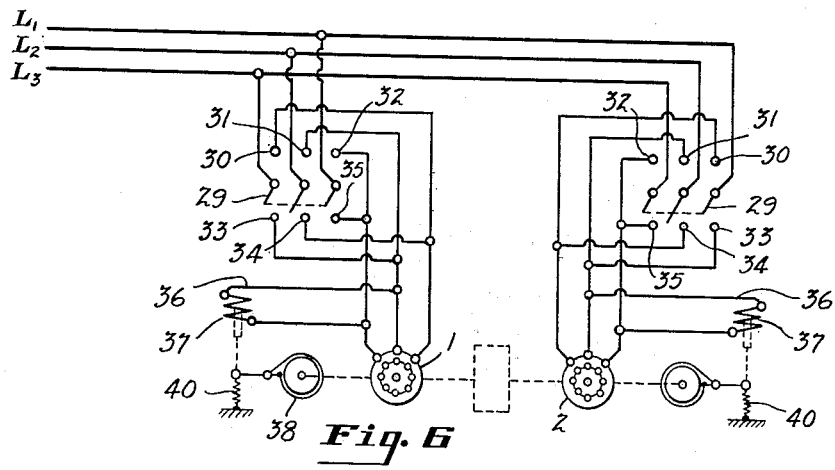
Fig. 6 is a wiring diagram showing electrical connections when alternating current motors are utilized.

One of the purposes of my invention, however, is to provide a system in which a comparatively large numer of different speeds may be obtained by the use of reversible induction motors as shown diagrammatically in Fig. 6 of the drawing in which alternating current may be supplied to motor 1 from lines $L_1$, $L_2$ and $L_3$ when switch 29 is in engagement with terminals 30, 31 and 32 to rotate the motor in one direction and in which current is supplied to motor 1 to rotate it in the opposite direction when switch 29 is in engagement with terminals 33, 34, and 35. A shunt circuit 36 is also provided containing a solenoid 37 which releases a brake 38 when the motor is energized. When switch 29 is open, however, brake 38 is applied by means of a spring 40 and motor 1 is maintained at rest. Motor 2 is energized in the same manner and consequently the same numerals have been utilized.

Assuming that motors 1 and 2 are alternating current motors of the induction type and that each may be maintained stationary or rotated at two difinite speeds, say, at 600 and 1200 revolutions per minute, it is possible to drive gear 8 and shaft 10 at twelve different speeds. For instance, when motor 1 is maintained stationary, by rotating motor 2 at 600 or 1200 revolutions per minute two different speeds may be obtained. Five additional speeds may be obtained when motor 1 is rotated in a clockwise direction at 600 revolutions per minute and motor 2 is maintained stationary or rotated in a clockwise or counterclockwise direction at speeds of 600 and 1200 revolutions per minute, and five additional speeds may be obtained when motor 1 is rotated at 1200 revolutions per minute in a clockwise direction and motor 2 is maintained stationary or rotated at 600 or 1200 revolutions per minute in a clockwise or a counterclockwise direction. Additional speeds may of course be obtained by varying the ratio between the shaft gear 6 and pinions 11 as compared to the ratio between shaft gear 7 and pinions 12. It will of course be understood, however, that the pitch diameter of shaft gear 6 plus the pitch diameter of one of the pinions 11 must be equal to the pitch diameter of shaft gear 7 plus the pitch diameter of one of the pinions 12.

In my improved system, the speed and direction of rotation of rotatable element 8 may be readily ascertained by means of the following formula:

$$Y = \frac{SBC - MAD}{BC - AD}$$

in which Y designates the rotative speed of the rotatable element 8, S designates the rotative speed of motor 1, M designates the rotative speed of motor 2, B is the pitch diameter of shaft gear 6, A is the pitch diameter of pinions 11, D is the pitch diameter of shaft gear 7 and C is the pitch diameter of pinions 12. In the formula, it as assumed that both motor 1 and motor 2 are rotating in a clockwise direction when viewed from the right hand end of motor 2. If motor 1 is rotated in a counterclockwise direction, the sign preceding the letter S is changed from plus to minus and if motor 2 is rotated in a counterclockwise direction the sign preceding the letter M is changed from minus to plus.

By utilizing the foregoing formula, and assuming that the pitch diameter of shaft gear 6 is five inches, the pitch diameter of each pinion 11 is 1 inch, the pitch diameter of shaft gear 7 is three inches, and the pitch diameter of each pinion 12 is three inches, it is possible when two reversible induction motors capable of being operated at two speeds are utilized to obtain speeds of gear 8 ranging from 150 revolutions per minute up to 1800 revolutions per minute with each speed being an increment or decrement of 150 revolutions per minute from the next lower or higher speed.

Another modification of my invention is shown in Fig. 4 of the drawings in which shaft 5 is provided with an extension 41 which is received within a bushing 42 arranged in a central opening or bore in gear 8. The extension 41 of shaft 5 maintains gear 8 in alignment and consequently in this modification it is not necessary to provide gears 8 and 9 with herringbone teeth and they may if desired be in the form of pulleys connected together by means of a belt. In this modification, it is only necessary to provide one pinion 11 and one pinion 12 although preferably two or more pinions 11 and two or more pinions 12 are utilized.

Figure 7:
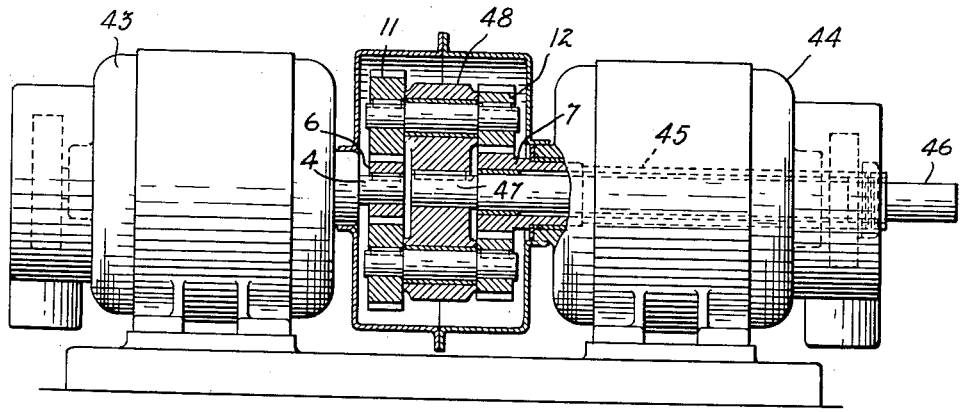
Fig. 7 is another modified form of my improved system.

A further modification of my invention is shown in Fig. 7 in which two aligned motors 43 and 44 are provided, preferably of the induction type. Motor 43 is of the standard form but the shaft 45 of motor 44 is tubular in form to receive a shaft 46 to be driven which is extended beyond shaft pinion 7 as indicated by the numeral 47 and is splined or otherwise affixed to a rotatable element 48. The remainder of the system is similar to that shown in Figs. 1 to 3 with the exception that in the system shown in Fig. 7, it is unnecessary to utilize more than one pinion 11 and one pinion 12 although, as shown, two or more of each may be and preferably are employed.

To show how the ratio of shaft gear 6 to pinions 11 may be varied with respect to the ratio of shaft gear 7 to pinions 12, in this modification shaft gear 6 is smaller than pinions 11 and shaft gear 7 is larger than pinions 12. The pitch diameter of shaft gear 6 plus one of the pinions 11, however, is equal to the pitch diameter of shaft gear 7 plus the pitch diameter of one of the pinions 12.

What I claim is:

1. In combination, a rotatable element having at least three uniformly spaced openings arranged equally distant from the axis thereof and means for rotating said elements at twelve different speeds, including two reversible induction motors, each being capable of being maintained stationary or of being rotated in either direction at two different constant speeds, said motors having their shafts in alignment and extending toward each other and each having a gear affixed thereto which gears are arranged on opposite sides of said element with their axes in alignment and one of said gears having a larger pitch diameter than the other gear, at least three pinions of the same pitch diameter in mesh with one of said gears and at least three pinions of the same pitch diameter in mesh with the other gear, and the pitch diameter of one of said motor shafts, plus the pitch diameter of one of the pinions in mesh therewith being equal to the pitch diameter of the other motor shaft gear plus the pitch diameter of one of the pinions in mesh therewith, and each pinion in mesh with one gear having its axis arranged opposite to the axis of a pinion in mesh with the other gear and one of said openings in said element, a shaft extending through each of the openings in said element and having one end secured to a pinion which is in mesh with one gear and its opposite end secured to a pinion which is in mesh with the other gear, whereby said element may be rotated at one of twelve different speeds depending upon the speed and direction of rotation of one or both of said motors, and means independent of the pinion shafts for supplementing the action of the pinion shafts in maintaining said rotatable element perpendicular to the axes of the motor shafts.

2. In combination, a rotatable element having an axial opening and at least three uniformly spaced openings arranged equally distant from the axis thereof and means for rotating said element at twelve different speeds, including two reversible induction motors, each being capable of being maintained stationary or of being rotated in either direction at two different constant speeds, said motors having their shafts in alignment and extending toward each other and each having a gear affixed thereto which gears are arranged on opposite sides of said element with their axes in alignment and one of said gears having a larger pitch diameter than the other gear, at least three pinions of the same pitch diameter in mesh with one of said gears and at least three pinions of the same pitch diameter in mesh with the other gear, and the pitch diameter of one of said motor shafts plus the pitch diameter of one of the pinions in mesh therewith being equal to the pitch diameter of the other motor shaft gear plus the pitch diameter of one of the pinions in mesh therewith, and each pinion in mesh with one gear having its axis arranged opposite to the axis of a pinion in mesh with the other gear and one of said spaced openings in said element and having one end secured to a pinion which is in mesh with one gear and its opposite end secured to a pinion which is in mesh with the other gear, whereby said element may be rotated at one of twelve different speeds depending upon the speed and direction of rotation of one or both of said motors, and one of said motor shafts being extended to be received within the axial opening of said element to supplement the action of the pinion shafts in maintaining said rotatable element perpendicular to the axes of said motor shafts.

3. In combination, a rotatable element in the form of a gear with herringbone teeth having at least three uniformly spaced openings arranged equally distant from the axis thereof and means for rotating said elements at twelve different speeds, including two reversible induction motors, each being capable of being maintained stationary or of being rotated in either direction at two different constant speeds, said motors having their shafts in alignment and extending toward each other and each having a gear affixed thereto which gears are arranged on opposite sides of said element with their axes in alignment and one of said gears having a larger pitch diameter than the other gear, at least three pinions of the same pitch diameter in mesh with one of said gears and at least three pinions of the same pitch diameter in mesh with the other gear, and the pitch diameter of one of said motor shaft gears, plus the pitch diameter of one of the pinions in mesh therewith being equal to the pitch diameter of the other motor shaft gear plus the pitch diameter of one of the pinions in mesh therewith, and each pinion in mesh with one gear having its axis arranged opposite to the axis of a pinion in mesh with the other gear and one of said openings in said element, a shaft extending through each of the openings in said element and having one end secured to a pinion which is in mesh with one gear and its opposite end secured to a pinion which is in mesh with the other gear, whereby said element may be rotated at one of twelve different speeds depending upon the speed and direction of rotation of one or both of said motors, and a shaft to be driven provided with a gear having herringbone teeth which are in mesh with the herringbone teeth of said rotatable element which teeth serve to supplement the action of the pinion shafts in maintaining said rotatable element perpendicular to the axes of said motor shafts.

GUSTAV A. REINHARD.

REFERENCES CITED

The following references are of record in the file of this patent:

UNITED STATES PATENTS

| Number | Name | Date |
|---|---|---|
| 436,127 | Edison | Sept. 9, 1890 |
| 933,506 | Walpole | Sept. 7, 1909 |
| 1,235,132 | Gaylord et al. | July 31, 1917 |
| 1,270,028 | Henderson | July 18, 1918 |
| 1,574,383 | Fraser | Feb. 23, 1926 |
| 1,810,821 | Eck | June 16, 1931 |
| 1,828,947 | Rossman | Oct. 27, 1931 |
| 1,828,948 | Rossman | Oct. 27, 1931 |
| 1,952,450 | McCormick | Mar. 27, 1934 |
| 1,992,210 | Higley | Feb. 26, 1935 |
| 2,126,691 | Schmitter | Aug. 9, 1938 |
| 2,148,564 | Kuhns | Feb. 28, 1939 |
| 2,231,784 | Von Thungen | Feb. 11, 1941 |
| 2,268,305 | Reinhard | Dec. 30, 1941 |

FOREIGN PATENTS

| Number | Country | Date |
|---|---|---|
| 9,423 | Great Britain | Apr. 21, 1909 |
| 427,868 | Great Britain | May 1, 1935 |
| 511,131 | Great Britain | Aug. 2, 1939 |
| 554,038 | Great Britain | June 17, 1943 |
| 356,516 | Germany | Jan. 9, 1921 |